US008611328B2

(12) United States Patent
Hein-Magnussen et al.

(10) Patent No.: US 8,611,328 B2
(45) Date of Patent: *Dec. 17, 2013

(54) COMMUNICATIONS TERMINAL, A SYSTEM AND A METHOD FOR INTERNET/NETWORK TELEPHONY

(75) Inventors: Jon Hein-Magnussen, Copenhagen S (DK); Peer Kuhlmann, Hvidovre (DK); Lars Stenfeldt Hansen, Charlottelund (DK)

(73) Assignee: Castani Co. L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,574

(22) Filed: Jan. 27, 2012

(65) Prior Publication Data

US 2012/0120878 A1    May 17, 2012

Related U.S. Application Data

(60) Division of application No. 12/153,062, filed on May 13, 2008, now Pat. No. 8,107,449, which is a continuation of application No. 11/711,009, filed on Feb. 27, 2007, now Pat. No. 7,408,915, which is a continuation of application No. 10/362,508, filed on Feb. 25, 2003, now Pat. No. 7,187,670.

(30) Foreign Application Priority Data

Sep. 1, 2000    (DK) ................................. 2000 01308

(51) Int. Cl.
*H04J 3/24* (2006.01)
*H04B 7/00* (2006.01)

(52) U.S. Cl.
USPC ........... 370/349; 370/389; 370/466; 455/41.2

(58) Field of Classification Search
USPC ......... 370/466–467, 469–476; 455/41.2, 416, 455/422.1–426.2, 445–450
See application file for complete search history.

(56) References Cited

U.S. PATENT DOCUMENTS

| 4,682,368 A | 7/1987 | Takahashi et al. |
| 5,113,428 A | 5/1992 | Fitzgerald |

(Continued)

FOREIGN PATENT DOCUMENTS

| EP | 0673587 B1 | 4/1996 |
| EP | 0766490 A2 | 4/1997 |

(Continued)

OTHER PUBLICATIONS

OA dated Jun. 1, 2005 for U.S. Appl. No. 10/362,508.

(Continued)

*Primary Examiner* — Tri H Phan
(74) *Attorney, Agent, or Firm* — Turocy & Watson, LLP

(57) ABSTRACT

A communication terminal for Internet telephony is provided that handles and control communication of data in accordance with a standardized network protocol and exchanges data with a connecting unit connected to the Internet where the resulting data exchanged between the terminal and a connecting unit consist of packets in a standardized protocol data packet format embedded in a wireless format. This provides a communications terminal which uses a network or the Internet for the transfer of digitized speech, etc., thereby achieving great economic savings. Also, the flexibility is increased with respect to wireless communication with the network or the Internet without any need for specialized equipment and functionality.

28 Claims, 6 Drawing Sheets

(56) References Cited

U.S. PATENT DOCUMENTS

| | | | |
|---|---|---|---|
| 5,907,307 A * | 5/1999 | Bickert et al. | 343/702 |
| 5,974,043 A | 10/1999 | Solomon | |
| 6,009,469 A | 12/1999 | Mattaway et al. | |
| 6,016,347 A | 1/2000 | Magnasco et al. | |
| 6,075,783 A | 6/2000 | Voit | |
| 6,104,711 A | 8/2000 | Voit | |
| 6,108,727 A | 8/2000 | Boals et al. | |
| 6,230,029 B1 | 5/2001 | Hahn et al. | |
| 6,272,148 B1 | 8/2001 | Takagi et al. | |
| 6,282,574 B1 | 8/2001 | Voit | |
| 6,327,476 B1 | 12/2001 | Koscal et al. | |
| 6,359,880 B1 | 3/2002 | Curry et al. | |
| 6,366,771 B1 | 4/2002 | Angle et al. | |
| 6,377,573 B1 | 4/2002 | Shaffer et al. | |
| 6,405,049 B2 | 6/2002 | Herrod et al. | |
| 6,507,655 B1 | 1/2003 | Yoon et al. | |
| 6,526,034 B1 | 2/2003 | Gorsuch et al. | |
| 6,570,871 B1 | 5/2003 | Schneider et al. | |
| 6,573,732 B1 * | 6/2003 | Reimer | 324/644 |
| 6,600,734 B1 | 7/2003 | Gernert et al. | |
| 6,643,284 B1 | 11/2003 | Inoue et al. | |
| 6,735,630 B1 | 5/2004 | Gelvin | |
| 6,760,601 B1 | 7/2004 | Suoknuuti et al. | |
| 6,831,902 B1 | 12/2004 | Dougherty et al. | |
| 6,842,623 B2 | 1/2005 | Koscal et al. | |
| 6,847,632 B1 | 1/2005 | Lee et al. | |
| 6,909,705 B1 | 6/2005 | Lee et al. | |
| 6,914,897 B1 | 7/2005 | Schuster et al. | |
| 6,970,474 B1 | 11/2005 | Sinha et al. | |
| 7,058,076 B1 | 6/2006 | Jiang et al. | |
| 7,187,670 B2 * | 3/2007 | Hein-Magnussen et al. | 370/349 |
| 7,408,915 B2 * | 8/2008 | Hein-Magnussen et al. | 370/349 |
| 7,577,910 B1 | 8/2009 | Husemann et al. | |
| 8,116,682 B2 * | 2/2012 | Chang | 455/41.1 |
| 2002/0061744 A1 | 5/2002 | Hamalainen et al. | |
| 2006/0001563 A1 | 1/2006 | Kearney et al. | |
| 2006/0210058 A1 | 9/2006 | Kock et al. | |
| 2006/0224048 A1 | 10/2006 | Devaul et al. | |
| 2006/0224901 A1 | 10/2006 | Lowe et al. | |
| 2006/0258289 A1 | 11/2006 | Dua et al. | |

FOREIGN PATENT DOCUMENTS

| | | |
|---|---|---|
| EP | 0781016 A2 | 6/1997 |
| GB | 2345613 A | 7/2000 |
| JP | 4172794 A | 6/1992 |
| JP | 2000115253 A | 4/2000 |
| JP | 2000174861 A | 6/2000 |
| WO | 97/14234 | 4/1997 |
| WO | 98/57508 A1 | 12/1998 |
| WO | 98/59469 A2 | 12/1998 |
| WO | 99/38311 A1 | 7/1999 |
| WO | 00/51375 A1 | 8/2000 |
| WO | 01/37524 A1 | 5/2001 |

OTHER PUBLICATIONS

OA dated Apr. 20, 2006 for U.S. Appl. No. 10/362,508.
OA dated Jul. 16, 2007 for U.S. Appl. No. 11/711,009.
OA dated Dec. 14, 2009 for U.S. Appl. No. 12/153,062, 16 pages.
International Search Report mailed Mar. 19, 2002 for PCT Application No. PCT/DK01/00571, 3 pages.
Notice of Allowance dated Oct. 4, 2010 for U.S. Appl. No. 12/153,062, 18 pages.
OA dated Feb. 15, 2011 for U.S. Appl. No. 12/153,062, 19 pages.
OA dated Aug. 23, 2011 for U.S. Appl. No. 12/153,062, 13 pages.
Notice of Allowance dated Sep. 28, 2011 for U.S. Appl. No. 12/153,062, 17 pages.
OA dated Jun. 15, 2010 for U.S. Appl. No. 12/153,062, 16 pages.

* cited by examiner

COMMUNICATIONS TERMINAL, A SYSTEM AND A METHOD FOR INTERNET/NETWORK TELEPHONY

CROSS-REFERENCE TO RELATED APPLICATIONS

This application is a division of U.S. patent application Ser. No. 12/153,062, filed on May 13, 2008, entitled "COMMUNICATIONS TERMINAL, A SYSTEM AND A METHOD FOR INTERNET/NETWORK TELEPHONY", which is a continuation of U.S. patent application Ser. No. 11/711,009, filed Feb. 27, 2007, entitled "COMMUNICATIONS TERMINAL, A SYSTEM AND A METHOD FOR INTERNET/NETWORK TELEPHONY", which is a continuation of U.S. patent application Ser. No. 10/362,508, filed Feb. 25, 2003, entitled "COMMUNICATIONS TERMINAL, A SYSTEM AND A METHOD FOR INTERNET/NETWORK TELEPHONY", which is a national stage entry of PCT Patent Application Serial No. PCT/DK01/00571, filed Sep. 3, 2001, entitled "A COMMUNICATIONS TERMINAL, A SYSTEM AND A METHOD FOR INTERNET/NETWORK TELEPHONY", which claims priority to Denmark Patent Application Serial No. PA 2000 01308, filed Sep. 1, 2000, the entireties of which are herein incorporated by reference.

BACKGROUND

This invention relates to an electronic portable communications terminal for Internet/network telephony. The invention also relates to a system for Internet/network telephony and to a method for the same.

The invention additionally relates to a computer-readable medium comprising a program which may be caused to execute the method of the invention on one or more computers or CPUs.

Telephony via the Internet (IP telephony) is a very low-cost alternative to ordinary telephony, in particular over long distances. Such systems convert the speech information into and from a suitable digital format, which is divided into data packets that are transported via the Internet itself, the actual transport via the Internet being typically at a fixed price.

Moreover, IP telephony may also be used for communication with a stationary conventional telephone coupled to the existing telephone network, as the Internet may be used for transmitting data to a local gateway which is connected to the existing public switched telephone network (PSTN). Thus, the user need just pay a local telephone charge even for long distance calls, as the Internet is used for the transport of data to the gateway/location concerned.

Such IP telephony systems/solutions will undoubtedly become more attractive as more and more people get access to the Internet and/or are connected in networks, and as the supply of fixed charge, free, permanent and broadband solutions in connection with the Internet and/or other networks gets greater.

Patent publication WO 00/51375 discloses a communication system where a dual-mode device is capable of both cell phone communication and telephone communication on a IP LAN/network. The dual-mode device connects to the LAN/network either via a cable connecting directly to the LAN/network or a cable connecting to a wireless communication device in wireless communication with a wireless LAN/network. The establishment of a connection to the LAN/network is troublesome since a cable is used and restricts the movement of the user when the dual-mode device is being used and requires for special equipment at the connecting point in the case of a wireless LAN/network.

Additionally, the support of both communication formats causes the dual-mode device to be of a complicated and more expensive design with a relative large power usage.

Patent Publication WO 98/57508 relates to a system for wireless communication via a DECT terminal and a base station, such as e.g. a digital wireless telephone connected to a base station. The system uses the IP protocol for passing on digital speech information via the Internet between various base stations (DECT islands), so that a given DECT terminal will receive a call at the base station at which the terminal is present. This provides increased mobility, as the terminal may be used at other base stations.

A gateway (GW) constitutes the very interface to the DECT base station and handles the conversion of telephone numbers into IP addresses, as the DECT terminal itself does not know its PP address which must be unique. Further, the DECT terminal(s) has to be known, identified and/or paired beforehand with the base station in order to establish communication.

Patent Publication WO 99/38311 relates to a system and a corresponding method of providing a wireless RF (Radio Frequency) interface between one or more terminals and an Internet Protocol (IP)/Internet telephone system, so that the terminals may be used for telephony via the Internet. The system uses a base station which partly handles and controls the distribution of information to the various terminals and partly handles the access to the Internet, which means that the base station controls/contains the relevant protocols inter alia in connection with the Internet.

Further, a terminal associated with a given base station cannot readily be used in connection with another base station, as the base station must know the number of terminals in order to allocate to each terminal its unique frequency and/or jump frequency for use in communication, so that the correct information is received/transmitted by the correct terminal.

The two above-mentioned systems both have the drawback that they require a specialized type of equipment (base station, gateway, etc.), which is a great obstacle to the flexibility with respect to mobility and updating/expansion of functionality, since the specialized equipment must be physically present at every single location where the terminals are contemplated for use.

SUMMARY

An object of the invention is to provide a communications terminal which uses a network and/or the Internet for transferring information/data representing digitized speech, sounds, music, etc.

Another object of the invention is to provide a communications terminal which increases the flexibility with respect to wireless communication/connection with a network and/or the Internet.

A further object of the invention is to provide a communications terminal which does not need specialized equipment and functionality to provide a connection to a network and/or the Internet.

Still a further object of the invention is to enable flexibility with respect to functionality.

Yet another object is to provide a communications terminal enabling relative simple design, small size, and relative low/reduced power consumption.

These objects, among others, are achieved by an electronic portable communications terminal for Internet/network telephony comprising audio means adapted to reproduce sound on the basis of a first electrical signal and to record sound resulting in a second electrical signal, converting means adapted to convert said second electrical signal into transmission data, representing sound for transmission, in a suitable data format, and to convert received data, representing received sound, in said suitable data format into said first electrical signal, and protocol means adapted to handle and control communication of said received and transmission data in accordance with a standardized Internet/network protocol, such as e.g. TCP/IP, thereby embedding and extracting said transmission and received data, respectively, in a data packet format, wherein said terminal further comprises wireless communications means for wireless near field communication of said received and/or transmission data in a wireless data format with a connecting unit adapted to establish a connection to a network and/or the Internet according to said standardized Internet/network protocol, where the wireless communications means is further adapted to embed/extract packets of said data packet format in/from said wireless data format.

A portable communications terminal is achieved hereby which provides telephony via a network or the Internet, which gives a considerable economic advantage.

The communications terminal establishes a wireless connection to a connecting unit which establishes a connection to the relevant network.

In addition, a communications terminal is provided which can independently control and communicate data packets according to a standardized Internet/network protocol such as e.g. the TCP/IP protocol. This makes it possible to use simplified standardized equipment, which must merely be capable of establishing a connection to a given network and/or the Internet. The wireless connection is just used for transferring the data packets to the connecting unit in an expedient manner.

In this way a terminal according to the invention may be used for Internet telephony, if just it is in the vicinity of standardized equipment allowing the set-up of a network and/or Internet connection. The local handling of the IP protocol also makes it easier to use the terminal in connection with "foreign" connecting units, since a configuration will be considerably easier and can be made automatically in certain types of wireless protocols.

Also provided is the option of dynamic allocation of a useful IP address via the protocol means, as a valid IP address for a given session (i.e. communication) may be allocated to the communications terminal. This results in even greater mobility, as the allocation may take place in dependence on the connecting unit with which the wireless connection is established, since the protocol means are present in the terminal itself. A user would be capable of receiving and transmitting a call regardless of the specific location as long as there is Internet/network access.

It is moreover ensured that the handling and functionality of several terminals are facilitated considerably, since e.g. a central database can relate unique and fixed addresses to users of the terminals, i.e. a local unique address is related to a temporary IP-address. A example of a local unique address may be the unique 48-bit address used in the Bluetooth protocol, a telephone number, etc.

Additionally, since only communication means for near field communication needs to be present, i.e. no other communication means like cellular communication means, etc., a relative low complexity and power consumption is obtained and a relatively small size of the terminal is made possible thereby making is very suitable for wearing and/or carrying by a user.

Preferably, the wireless data format is a Bluetooth data format.

In a preferred embodiment, said terminal is adapted to communicate additional information and/or data with said connecting unit, wherein said additional information and/or data comprises one or more of:

an IP address of a communication receiver,
an IP address of a communication transmitter/said terminal,
an IP address of at least one connecting unit,
an IP address of a service server,
TCP/IP packets,
speech mails,
commercials,
music,
stock exchange and financial news
chat-lines,
chat-rooms,
telephone meetings.

Relevant information may be sent in this way together with the transmitted speech information, whereby various functionalities may be provided, optionally in dependence on a user profile.

In a preferred embodiment, said terminal is adapted to establish a connection to a service server on said network and/or the Internet via the connecting unit, so that information concerning a desired communication receiver may be transferred to the server, said server being adapted to pass on information concerning the IP address of the desired communication receiver and/or to provide a direct connection between the desired communication receiver and a communication transmitter/said terminal.

Hereby, a central server can keep track of which terminals are accessible and where, so that a user wishing to make a call is merely to know an alias, a nickname, the IP address, etc. of the user whom it is desired to contact.

In a further embodiment, said terminal comprises speech recognition means adapted to analyze and interpret said sound for recording and/or said transmission data to identify one or more commands.

This makes the terminal easier to operate for a user, and the physical dimensions of the terminal itself may be reduced, as operating buttons, etc. can be avoided completely or reduced greatly in numbers.

In an embodiment, said near field communications means for near field communication are adapted to communicate in the form of one or more of:

an RF communications protocol such as e.g. Bluetooth, DECT, etc.,
an infrared communications protocol, or
another wireless communications protocol.

In an embodiment, said suitable data format is a compressed data format. This provides a better/optimal utilization of the available bandwidth on the network and/or the Internet used, as the data packets/the digital information are/is compressed prior to transmission.

In a preferred embodiment, said terminal is an ear telephone which comprises means for capturing sound for said recording via the cheekbone and the soft tissue in the auditory canal of a user. Alternatively, the terminal comprises means for capturing sound via a boom microphone.

This provides a very discrete, compact and hands-free or minimally hand-operated communications terminal of a small physical size. An example of an ear telephone that may be used in connection with the present invention is disclosed in the European Patent Application EP 0 673 587 incorporated herein by reference.

In another preferred embodiment, the terminal is a headset comprising a housing comprising the converting means, the wireless communication means, and the protocol means, an earpiece secured to the housing comprising means for reproducing sound on the basis of the first electrical signal, a brace secured to the housing at one end and with a sound capturing unit for capturing sound for transmission in the form of a second electrical signal located at the other end of the brace, thereby allowing for easy carrying and use of the terminal and providing a very discrete, compact and hands-free or minimally hand-operated communications terminal of a small physical size.

In one embodiment the headset also comprises a second brace, spring, arm, etc. secured to the housing which may stabilises and secures the headset to a user's head by being adapted to engage the user's ear.

A further object of the invention is to provide a system which has the above-mentioned advantages and accomplishes the above-mentioned objects.

This is achieved by a system for Internet telephony, said system comprising
    a portable communications terminal according to one or more of the above embodiments,
    a connecting unit adapted to establish a connection to a network and/or the Internet,
    a service server connected to the Internet and/or a network, said server comprising one or more databases comprising information related to potential desired communication receivers and/or transmitters, said server being adapted to pass on information concerning the IP address of a desired communication receiver and/or establish a direct connection between the desired communication receiver and a communication transmitter/said terminal.

A system is achieved hereby wherein a central service server can handle and control the connection between a large number of users. Further, also the option of further functionality is provided, e.g. in the form of news, reading of mails, speech mails, commercials, music, stock exchange and financial news, etc., which may be transmitted to a user of the system, e.g. depending on a user profile. Moreover, it is possible to provide functionalities, such as chat-lines, chat-rooms, telephone meetings, etc., where several terminals/users can communicate with each other so that everybody can hear what everybody says.

In an embodiment, the system additionally comprises speech recognition means adapted to analyse and interpret data representing sound to identify one or more commands. Speech recognition may be achieved hereby without necessarily having them placed in a terminal according to the invention, which is a great advantage since speech recognition requires relatively great resources of processor power and storage capacity.

A further object of the invention is to provide a method and embodiments thereof enabling the same possibilities and the same advantages as are provided by the embodiments of the communications terminal described above.

This is achieved by a method for Internet/network telephony comprising the steps of
    reproducing sound on the basis of a first electrical signal and recording sound resulting in a second electrical signal, by audio means,
    converting said second electrical signal into transmission data, representing sound for transmission, in a suitable data format, and converting received data, representing received sound, in said suitable data format into said first electrical signal, by converting means, and
    handling/control of communication with said received and transmission data in accordance with a standardized Internet/network protocol, such as e.g. TCP/IP, and embedding and extracting said transmission and received data, respectively, in/from a data packet format according to said standardized Internet/network protocol, by protocol means,
    wherein the method further comprises the steps of
    wireless near field communication of said received and/or transmission data in a wireless data format with a connecting unit adapted to establish a connection to a network and/or the Internet according to said standardized Internet/network protocol
    embedding/extracting packets of said data packet format in/from said wireless data format.

In an embodiment, said method communicates additional information and/or data with said connecting unit, and said additional information and/or data comprises one or more of:
    an IP address of a communication receiver,
    an IP address of a communication transmitter/said terminal,
    an IP address of at least one connecting unit,
    an IP address of a service server,
    TCP/IP packets,
    speech mails,
    commercials,
    music,
    stock exchange and financial news,
    chat-lines,
    chat-rooms,
    telephone meetings.

In a further embodiment, said method establishes a connection to a service server on said network and/or the Internet via said connecting unit, so that information concerning a desired communication receiver may be transferred to the server, said server being adapted to pass on information concerning the IP address of the desired communication receiver and/or to establish a direct connection between the desired communication receiver and a communication transmitter/said terminal.

In another embodiment, said method comprises speech recognition for analysis and interpretation of said sound for recording and/or said transmission data to identify one or more commands.

In still another embodiment, said communications means for near field communication communicates in the form of one or more of:
    an RF communications protocol such as e.g. Bluetooth, DECT or the like,
    an infrared communications protocol, or
    another wireless communications protocol.

In an embodiment, said suitable data format is a compressed data format.

In one embodiment, the method is used in an ear telephone which comprises means for capturing sound for said recording via the cheek-bone and the soft tissue in the auditory canal of a user.

In one embodiment, the method is used in a headset comprising a housing comprising converting means, wireless near-field communication means, and protocol means, an earpiece secured to the housing comprising means for reproducing sound on the basis of the first electrical signal, a brace secured to the housing at one end and with a sound capturing unit for capturing sound for transmission in the form of a second electrical signal located at the other end of the brace.

The invention additionally relates to a computer-readable medium comprising a program written thereon, wherein the program, when being executed, causes the computer to perform the method according to the present invention.

The computer-readable medium may be a suitable volatile nor non-volatile medium, such as e.g. a CD-ROM, a magnetic disc, a ROM circuit, a network connection or generally any other medium which can provide a computer system with information on how instructions/commands are to be performed/executed.

BRIEF DESCRIPTION OF THE DRAWINGS

The invention will be explained more fully below with reference to the drawing, in which.

DETAILED DESCRIPTION OF EMBODIMENTS

Figure 1:
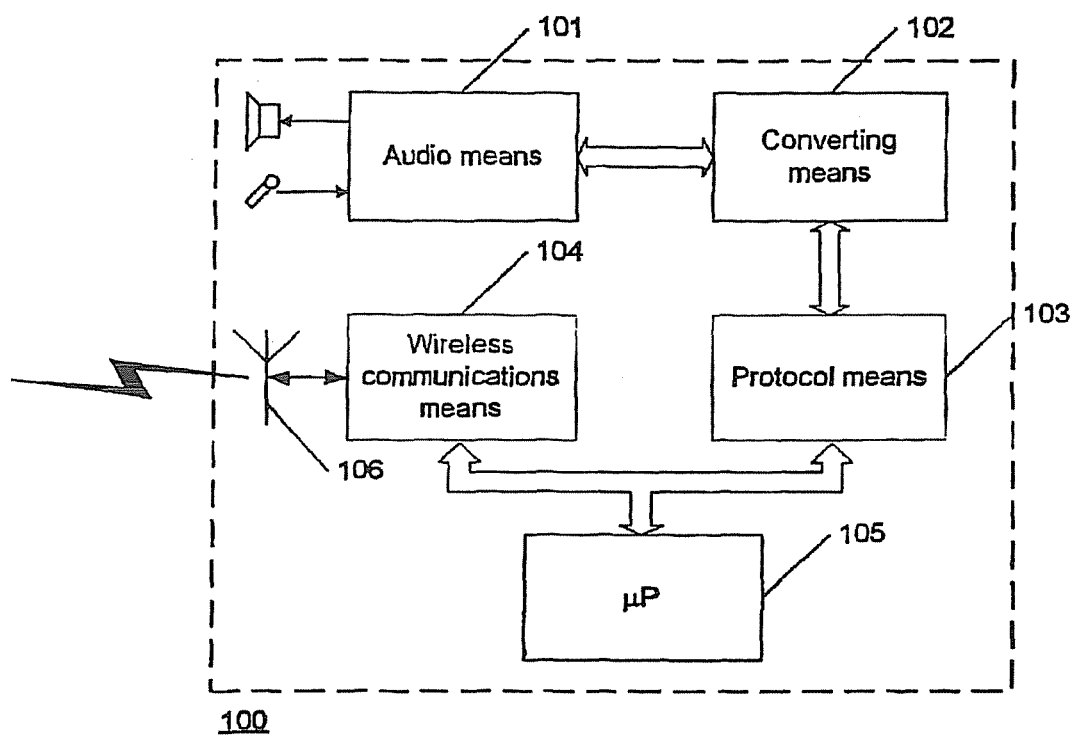
FIG. 1 shows a schematic block diagram of a communications terminal according to an embodiment of the invention.

FIG. 1 shows a schematic block diagram of a communications terminal (100) according to an embodiment of the invention. Shown schematically in the figure are audio means (101) e.g. in the form of some type of loudspeaker, sound generator, transducer, etc., and some type of microphone, transducer or other sound capturing unit.

The audio means (101) are used for playing/reproducing received sound information, such as e.g. speech, music, etc., in the form of a first electrical signal, and for capturing sound for transmission in the form of a second electrical signal, respectively.

Also shown are converting means (102) which convert the second electrical signal into a suitable digital sound format suitable for transmission. The converting means (102) also convert received sound data in the suitable digital sound format into the first electrical/analog signal prior to playing via the loudspeaker, sound generator, transducer, etc.

The converting means (102) comprise A/D and D/A converters and/or a codec (coder and decoder) for converting between analog and digital sound. If a codec is used, the digitized data may be compressed so that the amount of data to be transmitted and received is reduced considerably.

The suitable digital sound format may e.g. be raw data, ADPCM, DTMF, PCM, Way, MP3 and other suitable digital sound formats, and several formats may e.g. be supported at the same time. Additionally, e.g. also one or more streaming sound/audio formats might be supported in the converting means (102).

The converting means (102) are connected to protocol means (103)/a protocol stack which provide for the handling of data/information in connection with transmission and reception of data. The protocol which is preferably used is the TCP/IP (Transmission Control Protocol/Internet Protocol) suit of protocols e.g. including PPP (Point-to-Point Protocol). The IP protocol part provides for the actual handling of data in the form of splitting or collection of the digital information in data packets as well as handling of receiver and transmitter information (in the form of IP addresses), while the TCP protocol part provides for the actual handling of the connection between receiver and transmitter.

The protocol means (103) may e.g. be comprised by a special- and/or general-purpose microprocessor, logic circuit, etc.

The protocol means (103) are connected to wireless communications means (104), which receive digitized sound/data in the form of IP packets from the protocol means (103) via a bus between the protocol means (103) and the wireless communication means (104) (e.g. under the control or via the microprocessor (105), as shown in FIG. 1. The aerial, antenna, etc. (106) is used for the wireless transmission with a connecting unit. This is for further wireless transmission. The communications means (104) also receive wireless data which are transmitted to the protocol means in the form of IP packets for further processing and playing via the converting means (102) and the audio means (101)/loudspeaker/sound generator.

The information which the communications means (104) receive or are to transmit, is typically embedded in a suitable format. So in this case the IP packets are embedded in a transmission format in accordance with wireless communication protocol e.g. also embedded in a packet format.

Preferably, the communications means (104) use an RF (Radio Frequency) connection in accordance with e.g. Bluetooth, DECT, IEEE802.11 or other wireless protocols. Bluetooth is especially advantageous for portable terminals since it is designed with low power consumption in mind. Alternatively, also infrared wireless communications protocols may be used.

The communications terminal (100) also comprises a calculating/processing unit, such as a CPU, microprocessor or the like, for controlling and coordinating the various parts. Preferably, the microprocessor (105) is connected to one or more memory elements (not shown), such as e.g. RAM, Flash, ROM, etc., for storage and provision of relevant information. In an alternative embodiment, the microprocessor (105) and the protocol means (103) is comprised in a single microprocessor unit.

That the terminal (100) contains protocol means (103) for handling/control allows the use of simplified standardized connection/coupling equipment, which must merely be capable of establishing a connection to a given network and/or the Internet, and the local handling of the IP protocol also makes it easier to use the terminal (100) in connection with "foreign" connecting units, since a configuration is considerably easier and may be made automatically in certain types of wireless protocols. The only requirement is the same RF communication system in the terminal and connection/coupling equipment with access to the Internet/a network.

In an alternative embodiment, the terminal (100) also comprises speech recognition means e.g. implemented via the microprocessor (15) and/or implemented via specialized hardware, so that the terminal (100) may be operated hands-free in case of spoken commands. Additionally/alternatively, the terminal comprises one or more operating means like buttons, switches, etc.

The terminal (100) also comprises an energy/power source (not shown) like one or more batteries.

Figure 2A:
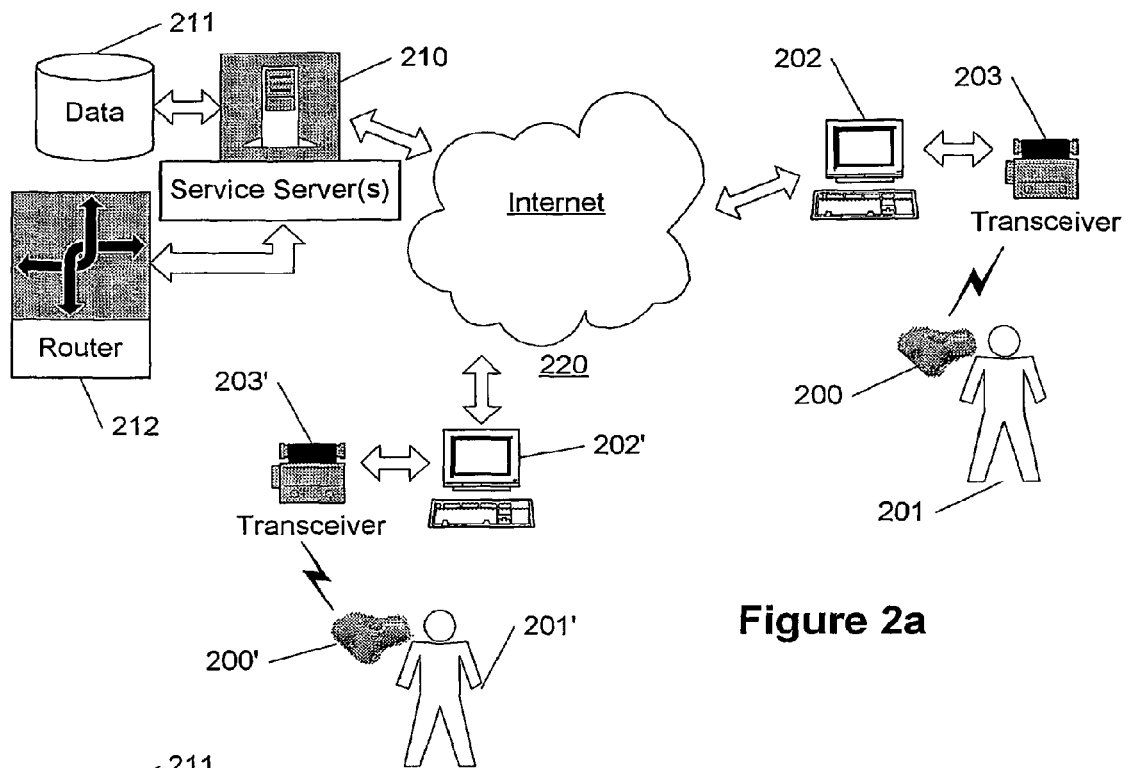
FIG. 2a illustrates a system according to the invention in which two communications terminals and a service server are shown.

FIG. 2a illustrates a system according to the invention where two communications terminals (200; 200') and a service server (210) are shown. The figure illustrates how two users (201; 201') are interconnected via the communications terminals (200; 200') according to the invention.

The terminals (200; 200') are illustrated in the figure as a preferred embodiment, both in the form of an ear telephone which will be explained more fully in connection with FIG. 4.

An alternative preferred embodiment of a terminal (200; 200') is explained in connection with FIG. 5.

The figure just shows two users (201; 201') for clarity, but in practice a much larger number of users will be connected to the system at the same time.

Each terminal (200; 200') is connected to the Internet (220) and/or another network, such as e.g. a local network or intranet in a company, household, etc. via a connecting unit (202; 202'). The connecting units (202; 202') are equipped with a wireless communications module/a transceiver (203, 203'), such as e.g. a Bluetooth module or the like, so that a wireless communications link is established between a given connecting unit (202; 202') and a given terminal (200; 200').

Several users (201; 201') may also be connected to the same wireless communications module/the same transceiver (203; 203').

The connecting units (202; 202') may e.g. be a standard computer, PDA, a mobile telephone etc. with Internet connection, preferably a broadband connection.

The system additionally comprises one or more service servers (210) likewise connected to the Internet/network (220). The service server (210) comprises one or more databases (211) where relevant information concerning the users (201; 201') of the system is saved.

The database (211) comprises information such as e.g. one or more user aliases per user (201; 201') and associated current IP addresses. The IP addresses may either be static (e.g. if the user (201; 201') is connected to a company network) or dynamic, where an IP address is allocated to the user (or rather the terminal (200; 200') each time the user (201; 201') connects to the system.

The server can thus keep track of which terminals (200; 200')/users (201; 201') are accessible and where.

The service server (210) additionally comprises at least one router (212) which establishes the connection between users (201; 201') who have wanted contact.

The service server (210) may also be used for contributing additional services, functions, etc., such as e.g. news, reading of mails, speech mails, commercials, music, stock exchange and financial news, etc., which may be sent to a user (201; 201') of the system, e.g. depending on a user profile.

A further functionality that may be provided by the server (210) is a chat-line, chat-rooms, telephone meetings, etc., where several terminals (200; 200')/users (201; 201') are given the opportunity of communicating with each other so that everybody can hear what everybody says.

A further option might be that the user profile comprises a "negative list" of persons with whom no contact is desired.

The system operates in that when e.g. a first user (201) wants to talk to a second user (201'), the first user (201) indicates this on the portable communications terminal (200). This indication may take place by keypad entering, voice command, etc. of an alias, an IP address or the like of the second user (201').

The terminal (200) establishes a connection via the wireless connection to the transceiver (203), the connecting unit (202) and the Internet (220), where e.g. the alias of the user (201') is transmitted. The server (210) checks whether the second user (201') with the forwarded alias is accessible/online and, if so, obtains a current IP address of the second user (201'). Then a two-way connection is established between the first user (201) and the second user (201') via the router (212).

Alternatively, the current IP address of the second user (201') may be sent back to the first user's (201) terminal (200), thereby allowing a direct two-way connection to be established between the terminals (200) and (200').

After the connection has been established, the Internet (220) is used for transporting speech between the two users (201; 201') in a suitable digital format in IP packets, as described in connection with FIG. 1.

If the terminal (200; 200') and/or the service server (210) supports speech recognition, the operation of the terminal (200; 200') may be simplified, and specific commands related to the service server may be passed on to the server (210) either for interpretation here or as one or more binary commands, a query or the like.

Alternatively, the connecting unit (202; 202') may be a mobile telephone adapted to be connected to the Internet (220) e.g. via a broadband connection equipped with e.g. Bluetooth or DECT functionality or other suitable wireless connections. Hereby, the user (201; 201') is given an even greater mobility and also the economic savings of IP telephony, as the long distance traffic takes place via the Internet (220). The mobile telephone may e.g. be of the type GSM, GPRS, etc. or of another suitable type.

Figure 2B:
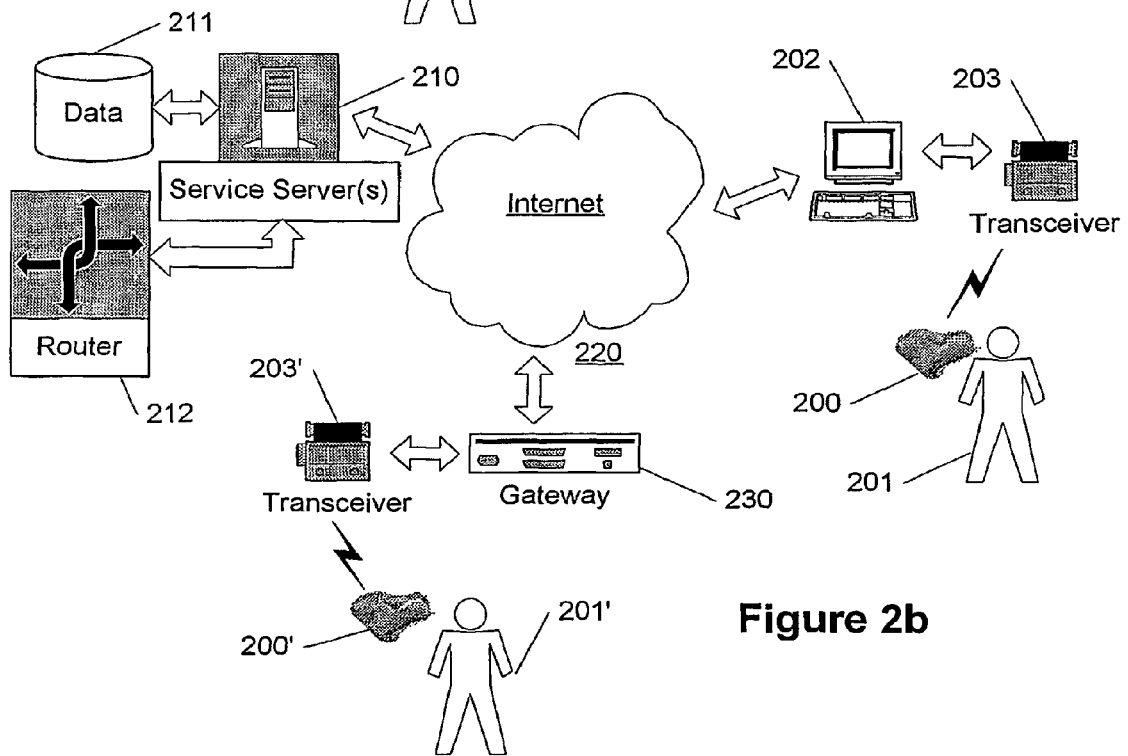
FIG. 2b illustrates the system according to the invention in which another type of connecting unit is shown.

FIG. 2b illustrates the system according to the invention, where another type of connecting unit is shown. This figure corresponds to FIG. 2a, but with the difference that the second user's (201') connecting unit is now formed by a gateway (230). The gateway (230) provides coupling possibilities for several terminals (200; 200')/users (201; 201') e.g. in a local network, intranet, a household, a block of flats, etc.

Alternatively, the gateway (230) may be provided/incorporated in a refrigerator, a television set e.g. via cable or satellite, or other household devices providing the possibility of access to the Internet. Preferably, a gateway (230) with broadband possibility is used, e.g. via ISDN, ADSL, Frame Relay, xDSL, etc.

Figure 2C:
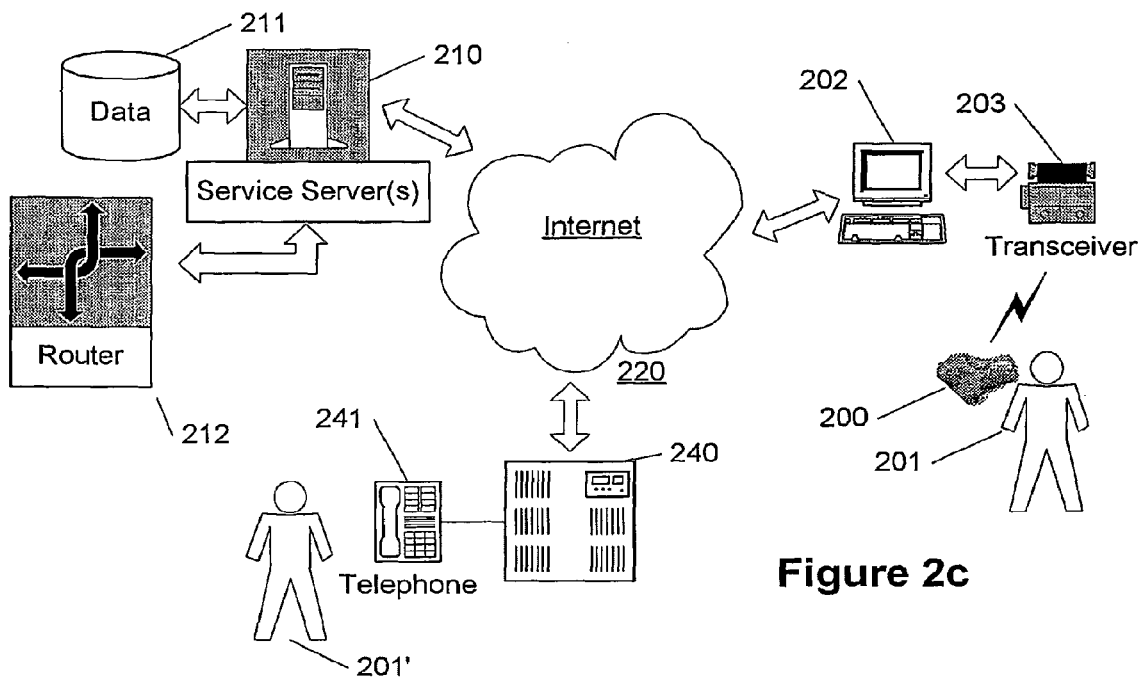
FIG. 2c illustrates the system according to the invention in which a user connected to the traditional telephone network (PSTN) is shown.

FIG. 2c illustrates the system according to the invention where a user coupled to the traditional telephone network (PSTN) is shown. This figure corresponds to FIGS. 2a and 2b with the difference that the second user's (201) connecting unit is now formed by a PSTN interface/gateway (240) coupled to the user's (201') ordinary standard telephone (241). It is hereby also possible to reach users on the traditional telephone network.

Figure 3A:
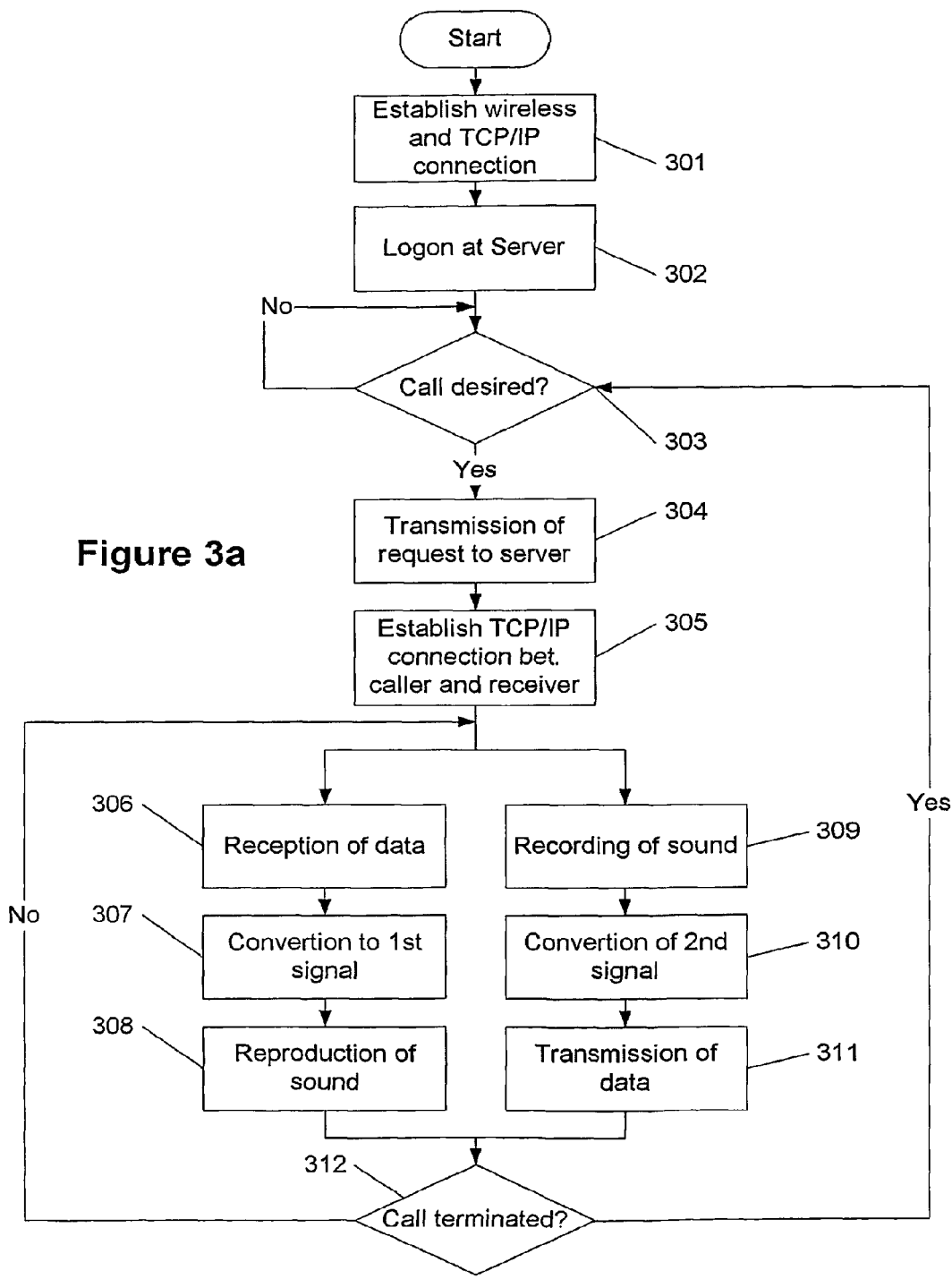
FIGS. 3a and 3b illustrates a flowchart of an embodiment of the method according to the invention.

FIG. 3a illustrates a flowchart of an embodiment of the method according to the invention.

In step (301), a wireless connection is established between a communications terminal, such as e.g. an ear telephone, a headset, etc. and a connecting unit, such as e.g. a computer, mobile telephone, Internet access point, PDA or the like providing the possibility of establishing a connection to the Internet or a connection to another network.

In step (302), the terminal transmits information using the TCP/IP protocol to a service server, coupled to the Internet/network via the connecting unit, regarding the identity of the user (alias, etc.), regarding whether the user is online (wants to be available for calls), and regarding the physical IP address at which the terminal may be reached. This information is stored/updated in one or more databases at the server.

Then, optionally in accordance with a user profile, the server can transmit data and information, such as news, reading of mails, speech mails, commercials, music, stock exchange and financial news, etc. to the user.

A check is made in step (303) as to whether the user wants to contact another user.

If so, a request is sent in step (304) to the server comprising e.g. an alias of the user whom it is desired to contact. The service server checks whether a user having this alias exists, whether the person concerned is online, and, if so, at which physical IP address this other user can be reached.

If this is not desired, then idle mode is resumed, and the check (303) is performed currently by interrupt, polling, etc. Other functions may be carried out in idle mode.

Then a connection is established in step (305) between the first and second users, following which the actual conversation can begin. The connection is preferably a TCP/IP connection either via the service server or directly. If the connection is direct a new/another TCP/IP connection has to be established between the to conversation participants and if the connection is via the server the TCP/IP connection established in step (301) may be used.

In steps (306)-(308), the data received from the second user are handled and played, but recording of sound and transmission of it to the second user take place in steps (309)-(311). These steps may be performed either simultaneously/parallel or alternating e.g. by multiplexing, etc.

In step (306), data are received via the wireless interface in the form of IP packets. The embedded sound data/information in the IP packets are/is converted into a first analog sound signal in step (307), e.g. by a D/A converter, codec, etc., and then it is reproduced/played for the user in step (308) e.g. via a loudspeaker, sound generator, etc.

In step (309), sound is captured by a microphone, a transducer, etc. in the form of a second electrical signal, which is converted via an A/D converter, codec, etc. into a digital signal in step (310). The information of this digital signal is split and embedded in IP packets by TCP/IP protocol means which is RF modulated (e.g. the IP packets are converted/embedded in packets according to the used RF protocol by wireless/RF communications means), and then the packets are transmitted to the second conversation partner via a transceiver receiving the RF packets and extracting the IP packets and transmitting the extracted IP packets via the Internet/the network to the second conversation partner.

These steps (306-308; 309-311) are repeated until the conversation has been terminated.

After the conversation has been terminated, which is checked in step (312), the system returns to idle mode in step (303) and waits for a new call (either incoming or outgoing).

Figure 3B:
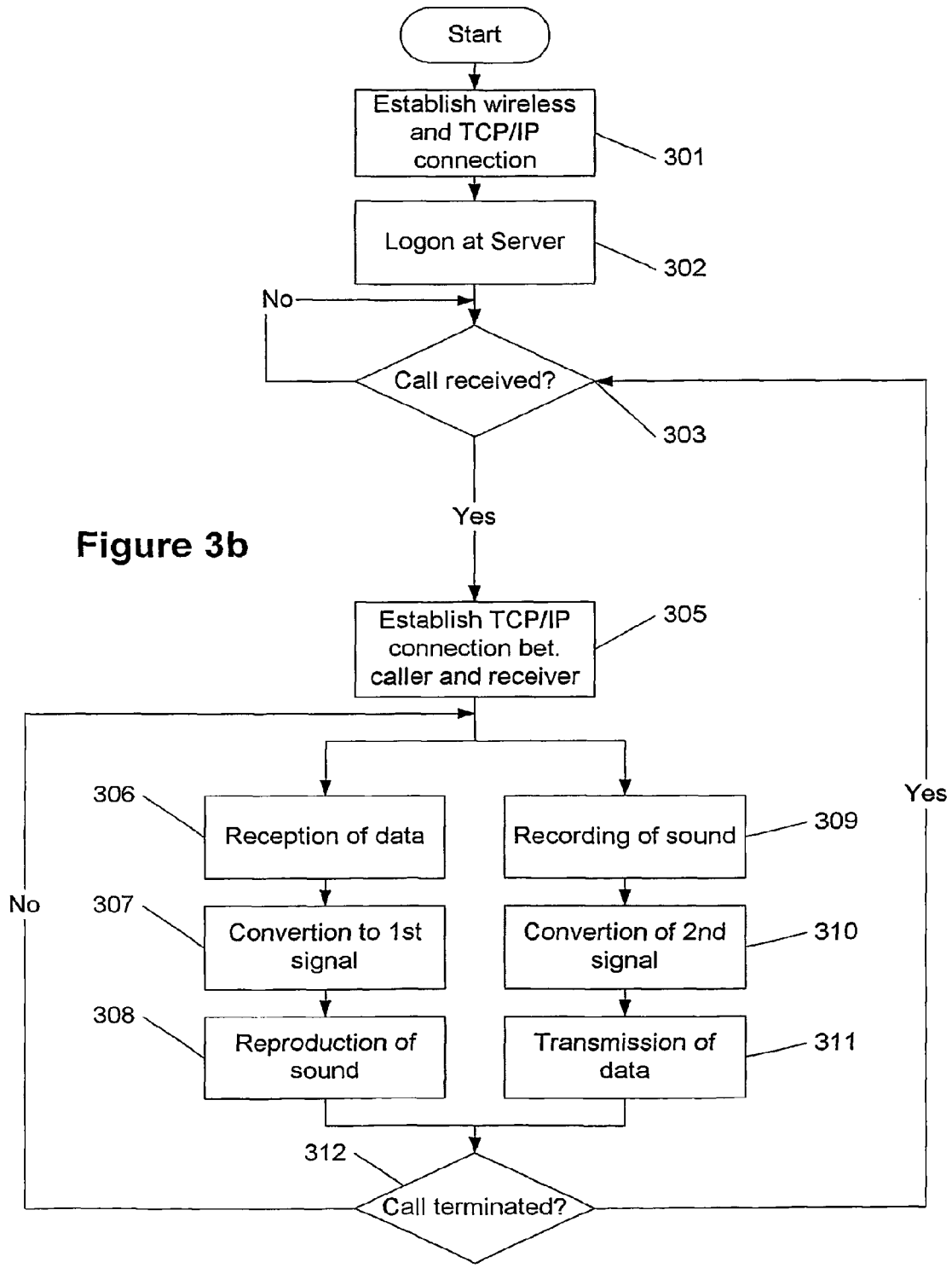

The steps of receiving a call, shown in FIG. 3b, is similar to the steps in FIG. 3a where an incoming call is detected and the user may have the option of accepting or refusing the call. If the call is accepted a TCP/IP connection between the caller and the receiver is established either directly or via a service server and steps like (306-311) are performed. If a call is refused the terminal returns to idle mode. Preferably, the method comprises the steps of (301-302), a test (303) of whether an incoming and/or outgoing call is detected, and the steps (304-312) where step (304) only is executed for outgoing calls.

Figure 4:
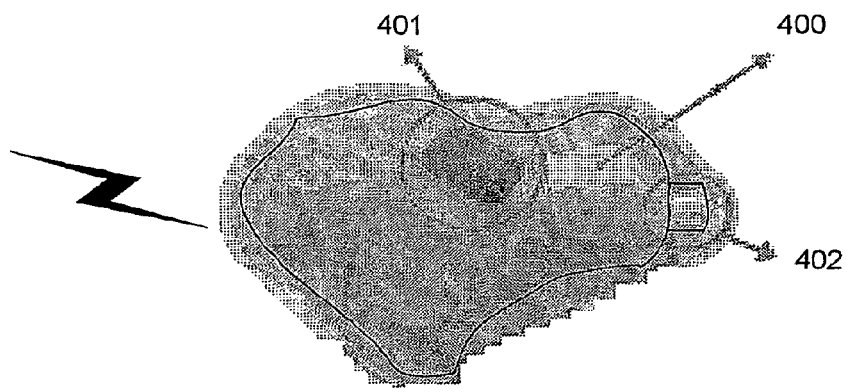
FIG. 4 shows a preferred embodiment of a communications terminal according to the invention.

FIG. 4 shows a preferred embodiment of a communications terminal according to the invention. An ear telephone (400) is shown in the figure. The ear telephone (400) is preferably moulded and can be manufactured individually in conformity with the user's ear. Shown is a sound generator (401), such as e.g. a loudspeaker which is used for reproducing sound information received via wireless communications means (not shown), as explained above. Also shown is some type of microphone, transducer or other sound capturing unit (shown in part) with a rubber coating (402) for sound capture and generation of a second electrical signal.

The functionality of the ear telephone corresponds to the terminal described in connection with FIG. 1 and the system.

This provides a very discrete, compact and hands-free or minimally hand-operated communications terminal of a small physical size e.g. 5-8 cm^3.

Alternatively, the wireless communications means may be arranged externally of the ear telephone (400) itself and e.g. be positioned in a housing which may be secured to the body of the user, e.g. in the belt. The housing and the ear telephone are then merely to be connected, e.g. via a wire or other wireless communications means which need a smaller range than the wireless communications means for communication with the connecting unit, and can therefore have a smaller physical size, smaller energy consumption, etc.

For further details of an example of an ear telephone reference is made e.g. to the European Patent Application EP 0 673 587.

Figure 5:
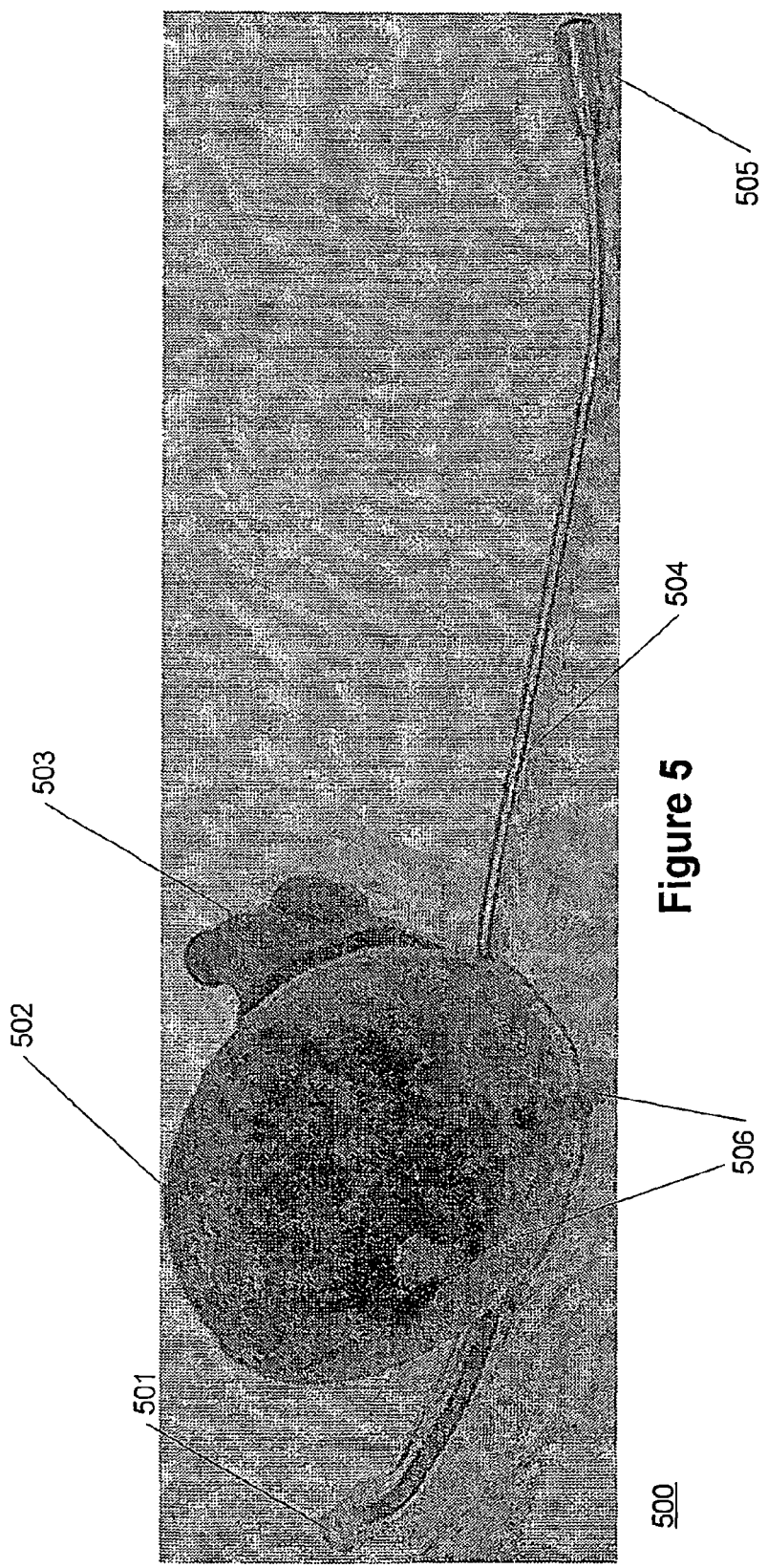
FIG. 5 shows a perspective view of an alternative preferred embodiment of a communications terminal according to the invention.

FIG. 5 shows a perspective view of an alternative preferred embodiment of a communications terminal according to the invention. Shown is very compact headset (500) comprising a microphone, transducer, or other sound capturing unit (505) for capturing sound for transmission in the form of a second electrical signal, where the sound capturing unit (505) is located at one end of a brace, arm, boom, etc. (504) so that the sound capturing unit may conveniently be placed in close proximity of a user's mouth. The other end of the brace, arm, boom, etc. (504) is secured to a, preferably watertight, container, housing, etc. (502) comprising the electronic elements/parts (except audio means) described in connection with FIG. 1.

A brace, spring, arm, etc. (501) is also shown secured to the housing (502) which may be used to stabilise and secure the headset (500) to a user's head.

The headset (500) also comprises an aerial, antenna, etc. (not shown) used for wireless communication and operating means (506) like one or more buttons, switches, etc. e.g. used for accepting/refusing calls. The aerial may be an intern aerial located in the housing (502). Alternatively, the brace, arm, boom, etc. (504) may constitute the aerial.

Secured to the housing (502) is an earpiece (503) that may be moulded and manufactured individually in conformity with a user's ear, to be inserted into the user's ear. The earpiece comprises a sound generator, etc. for playing the received sound in the user's ear.

Hereby, a very discrete, compact and hands-free or minimally hand-operated communications terminal of a small physical size is obtained.

The invention claimed is:

1. An apparatus, comprising:
 a conversion unit configured to convert a first signal representing detected sound to digital data;
 a protocol unit configured to convert the digital data to at least one first data packet that is formatted according to a first network protocol; and
 a wireless unit configured to embed the at least one first data packet within first wireless data that is formatted according to a second network protocol, and transmit the first wireless data over a near field communication network in accordance with the second network protocol.

2. The apparatus of claim 1, further comprising an audio unit configured to convert the detected sound to the first signal.

3. The apparatus of claim 1, wherein the wireless unit is further configured to receive second wireless data that is formatted according to the second network protocol, the second wireless data comprising at least one second data packet formatted according to the first network protocol, and to extract the at least one second data packet from the second wireless data.

4. The apparatus of claim 3, wherein the protocol unit is further configured to combine the at least one second data packet with other digital data.

5. The apparatus of claim 4, wherein the conversion unit is further configured to convert the other digital data to a second signal.

6. The apparatus of claim 5, wherein the audio unit is further configured to generate sound based on the second signal.

7. The apparatus of claim 1, wherein the wireless unit is further configured to include, within the first wireless data, contact information indicating a destination for the digital data.

8. A method, comprising:
  converting a first signal representing detected sound to first digital data;
  converting the first digital data into one or more first data packets that accord to a network protocol of a first network;
  embedding the one or more first data packets into first wireless data that accords to a network protocol of a near field communication network; and
  transmitting the first wireless data via the near field communication network in accordance with the network protocol of the second network.

9. The method of claim 8, wherein the converting the first digital data includes converting the first digital data into the one or more first data packets that accord to at least one of a transmission control protocol, an internet protocol, or a point-to-point protocol.

10. The method of claim 8, further comprising:
  receiving second wireless data that accords to the network protocol of the near field communication network, the second wireless data comprising one or more second data packets that accord to the network protocol of the first network; and
  extracting the one or more second data packets from the second wireless data.

11. The method of claim 10, further comprising combining the one or more second data packets into second digital data.

12. The method of claim 11, further comprising converting the second digital data to a second signal.

13. The method of claim 12, further comprising generating sound based on the second signal.

14. The method of claim 8, wherein the transmitting includes transmitting the first wireless data together with identifier information identifying a target device for the first digital data.

15. A computer-readable storage device having stored thereon computer-executable instructions that, in response to execution, cause a computer system to perform operations, including:
  converting a first signal representing received sound to first digital data;
  converting the first digital data into one or more first data packets formatted in accordance with a first network protocol;
  embedding the one or more first data packets within first wireless data formatted in accordance with a near field communication network protocol; and
  transmitting the first wireless data over a wireless network in accordance with the near field communication network protocol.

16. The computer-readable storage device of claim 15, wherein the converting the first digital data includes converting the first digital data into the one or more first data packets formatted in accordance with at least one of a transmission control protocol, an internet protocol, or a point-to-point protocol.

17. The computer-readable storage device of claim 15, the operations further including:
  receiving second wireless data, in accordance with the near field communication network protocol, comprising one or more second data packets formatted in accordance with the first network protocol; and
  extracting the one or more second data packets from the second wireless data.

18. The computer-readable storage device of claim 17, the operations further including combining the one or more second data packets into second digital data.

19. The computer-readable storage device of claim 18, the operations further including converting the second digital data to a second signal.

20. The computer-readable storage device of claim 19, the operations further including converting the second signal to sound.

21. The computer-readable storage device of claim 15, the operations further including transmitting address information specifying a destination for the first digital data.

22. A system comprising:
  means for converting a first signal representing detected sound to first digital data;
  means for converting the first digital data to a first data packet formatted to accord with a network protocol of a first network;
  means for embedding the first data packet within wireless data formatted to accord with a network protocol of a near field communication network; and
  means for transmitting the wireless data over the near field communication network according to the network protocol of the near field communication network.

23. The system of claim 22, further comprising means for converting the detected sound to the first signal.

24. The system of claim 22, wherein the means for converting the first digital data includes means for converting the first digital data to the first data packet formatted in accordance with at least one of a transmission control protocol, an internet protocol, or a point-to-point protocol.

25. The system of claim 22, further comprising:
  means for receiving second wireless data via the network protocol of the near field communication network, the second wireless data comprising a second data packet formatted in accordance with the network protocol of the first network; and
  means for extracting the second data packet from the second wireless data.

26. The system of claim 25, further comprising means for converting the second data packet to second digital data.

27. The system of claim 26, further comprising means for converting the second digital data to a second signal.

28. The system of claim 27, further comprising means for generating sound based on the second signal.

* * * * *

UNITED STATES PATENT AND TRADEMARK OFFICE
CERTIFICATE OF CORRECTION

| | | |
|---|---|---|
| PATENT NO. | : 8,611,328 B2 | Page 1 of 1 |
| APPLICATION NO. | : 13/360574 | |
| DATED | : December 17, 2013 | |
| INVENTOR(S) | : Hein-Magnussen et al. | |

It is certified that error appears in the above-identified patent and that said Letters Patent is hereby corrected as shown below:

On the Title Page, in item (75), under "Inventors", in Column 1, Line 3, delete "Charlottelund" and insert -- Charlottenlund --, therefor.

On the Title Page, in Column 1, delete item "(60)" and insert item -- (62) --, therefor.

In the Specification

In Column 1, Line 60, delete "a IP" and insert -- an IP --, therefor.

In Column 2, Line 18, delete "PP address" and insert -- IP address --, therefor.

In Column 4, Line 20, delete "news" and insert -- news, --, therefor.

In Column 7, Line 63, delete "Way," and insert -- Wav, --, therefor.

In Column 11, Line 18, delete "the to" and insert -- the two --, therefor.

Signed and Sealed this
Thirteenth Day of May, 2014

Michelle K. Lee
*Deputy Director of the United States Patent and Trademark Office*